UNITED STATES PATENT OFFICE.

FRITZ HOFMANN, OF ELBERFELD, GERMANY, ASSIGNOR TO THE FARBENFABRIKEN OF ELBERFELD CO., A CORPORATION OF NEW YORK.

SALICYLIC ETHER OF QUININ.

SPECIFICATION forming part of Reissued Letters Patent No. 11,960, dated January 7, 1902.

Original No. 678,401, dated July 16, 1901. Application for reissue filed December 9, 1901. Serial No. 85,302.

*To all whom it may concern:*

Be it known that I, FRITZ HOFMANN, doctor of philosophy, chemist, residing at Elberfeld, Germany, (assignor to the FARBENFABRIKEN OF ELBERFELD COMPANY, of New York,) have invented a new and useful Improvement in Pharmaceutical Compounds; and I hereby declare the following to be a clear and exact description of my invention.

My invention relates to the production of the hitherto unknown salicylic ether of quinin, having most probably the following formula:

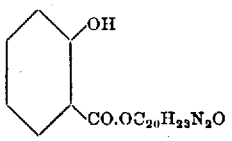

According to my researches this new compound can be easily obtained by heating the alphyl ethers of salicylic acid, generally termed "salols," with quinin. On using, for instance, phenyl salicylate the process proceeds according to the following equation:

$$C_6H_4\begin{cases}OH\\CO.OC_6H_5\end{cases}+C_{20}H_{24}N_2O_2=C_6H_5OH+C_6H_4\begin{cases}OH\\CO.OC_{20}H_{23}N_2O\end{cases}$$

phenol and the new quinin salicylate being produced. The new quinin derivative thus obtained is tasteless and possesses a great therapeutic value. It is a valuable remedy against fever. The average dose employed for this purpose is about one-half gram.

In carrying out my new process practically I can proceed as follows, the parts being by weight: In a vessel provided with a descending condenser a mixture prepared from three hundred and twenty-four parts of quinin (free from water) and two hundred and fourteen parts of salol (phenyl salicylate) is heated by means of an oil-bath *in vacuo* to a temperature of from 170° to 190° centigrade. After the mixture has melted the distillation of pure phenol begins, which solidifies in the receiver to a crystalline mass. After the reaction is finished the residue remaining in the vessel is dissolved in chloroform, and the solution thus obtained is treated with a one-per-cent acetic acid, by which means unchanged quinin is removed from the chloroform solution. Subsequently this solution is shaken with dilute sulfuric acid in order to transform the new quinin derivative contained therein into its sulfate. The resulting sulfuric-acid solution of the new body is then separated from the chloroform. In order to prepare the free quinin derivative, the sulfuric-acid solution is mixed with an excess of sodium carbonate, and from the resulting mixture the free base of quinin salicylate is isolated in the usual way by shaking the mixture with ether. From the resulting ethereal solution the new compound separates after some time in the shape of white needles. It is filtered off and dried.

The new salicylic ether of quinin having most probably the above-given formula is a white crystalline powder melting at 138° centigrade and at 140° centigrade after further purification. It is very readily soluble in chloroform, readily soluble in hot alcohol and in benzene, and soluble with difficulty in ether and in cold alcohol. Ferric chlorid ($FeCl_3$) colors its alcoholic solution reddish brown.

Having now described my invention and in what manner the same is to be performed, what I claim as new, and desire to secure by Letters Patent, is—

The herein-described new salicylic ether of quinin having most probably the formula:

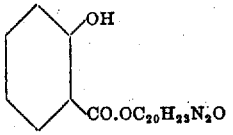

being a tasteless white crystalline powder melting at 140° centigrade when purified which is very readily soluble in chloroform, readily soluble in hot alcohol and in benzene and soluble with difficulty in ether and in cold alcohol, the alcoholic solution being colored reddish brown by a ferric-chlorid solution, substantially as hereinbefore described.

In testimony whereof I have signed my name to this specification in the presence of two subscribing witnesses.

FRITZ HOFMANN.

Witnesses:

OTTO KÖNIG,

J. A. RITTERSHAUS.